Figure 1:
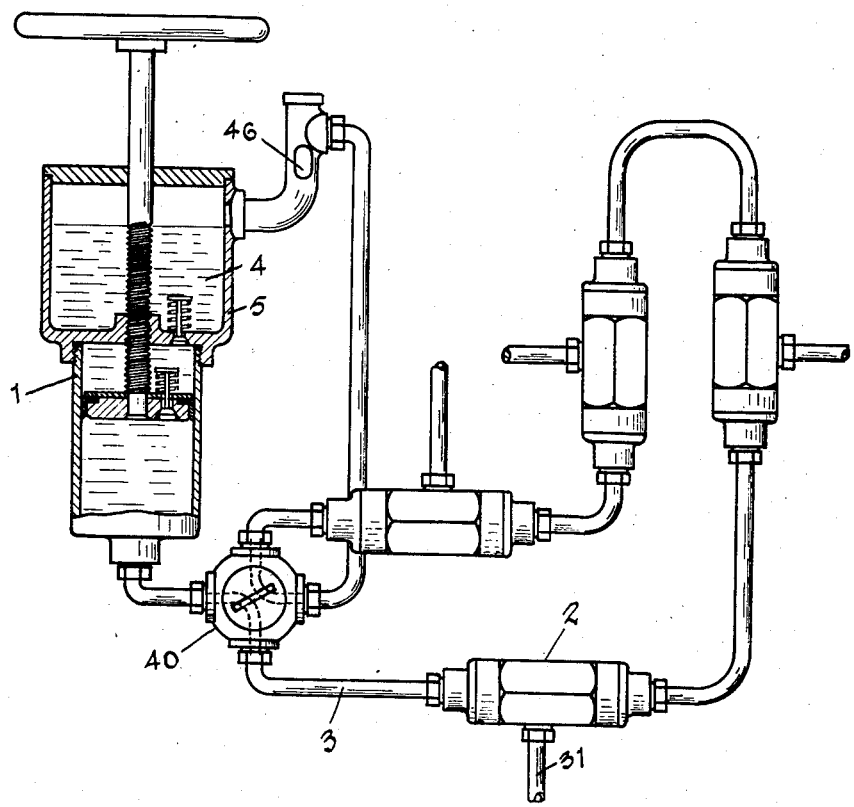

Dec. 12, 1933.　　　M. R. HATCH　　　1,939,262
LUBRICATING SYSTEM
Filed Nov. 24, 1930　　2 Sheets-Sheet 1

Inventor
Meredith R. Hatch
By
Attorney

Dec. 12, 1933.  M. R. HATCH  1,939,262
LUBRICATING SYSTEM
Filed Nov. 24, 1930  2 Sheets-Sheet 2
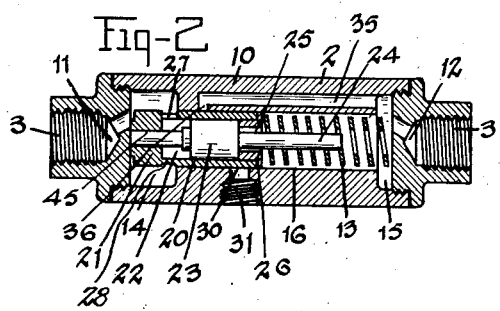
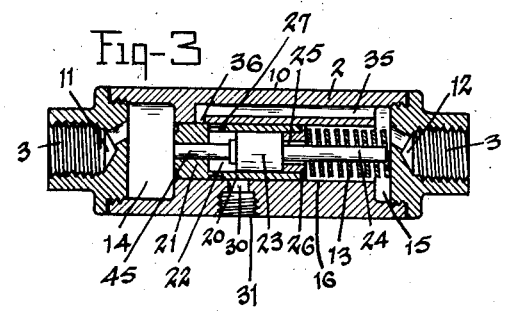
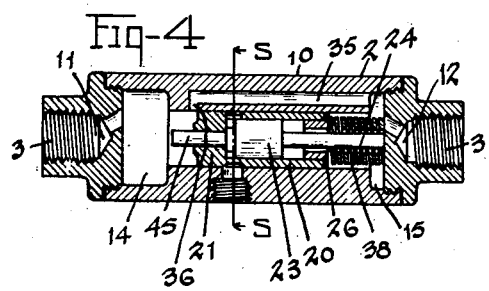
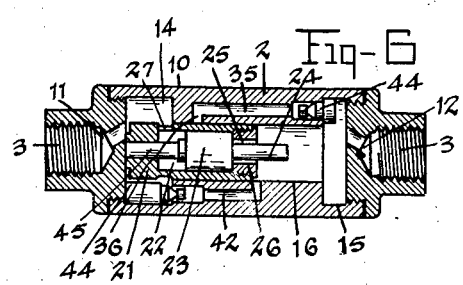
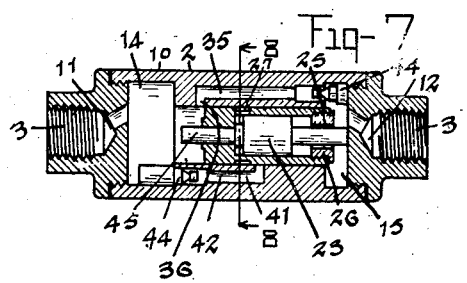
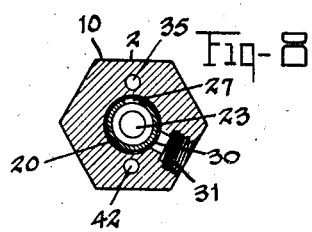
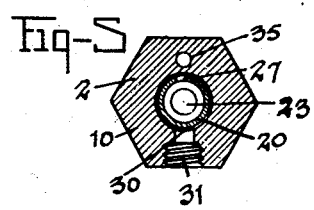
Inventor
Meredith R. Hatch
By Faust F. Crampton
Attorney Patented Dec. 12, 1933

1,939,262

UNITED STATES PATENT OFFICE 1,939,262

LUBRICATING SYSTEM

Meredith R. Hatch, Toledo, Ohio

Application November 24, 1930
Serial No. 497,699

9 Claims. (Cl. 184—7)

My invention has for its object to provide an efficient lubricating system which will deliver a lubricant to a point of lubrication, or to a plurality of points of lubrication, such as to a plurality of bearing members, which may be located in different parts of a machine. My invention has for its particular object to provide a means whereby each and all of the bearing members may be lubricated with a measured quantity of lubricant. My invention also provides a means whereby the movement of the lubricant through the system will be visible to the operator, thereby indicating and insuring the uniform lubrication of the bearing members.

The invention may be contained in lubricating systems that vary in their details of construction and, to illustrate a practical application of the invention, I have selected a lubricating system containing the invention as an example of the various forms of structure that embody the invention, and shall describe it hereinafter. The lubricating system selected, for purposes of illustration, is shown in the accompanying drawings.

Fig. 1 illustrates a lubricating system embodying the invention. Fig. 2 illustrates a view of a longitudinal section of one of the feeders of the lubricating system, the internal parts being in position of having received a charge of lubricant. Fig. 3 illustrates a view of a similar longitudinal section of the feeder shown in Fig. 2, the internal parts having shifted in relation to each other in the sequential operation of measuring the lubricant to be directed to the bearing member. Fig. 4 illustrates a view of a similar longitudinal section of the feeder illustrated in Fig. 2, the internal parts having changed further in their relationship and positioned to discharge the lubricant to the member to be lubricated. Fig. 5 illustrates a view taken on the plane of the line 5—5 indicated in Fig. 4. Fig. 6 illustrates a view of a longitudinal section of a modified form of a feeder shown in Fig. 1, showing the internal parts in position having received a charge of lubricant. Fig. 7 illustrates a view of a similar longitudinal section of the feeder illustrated in Fig. 6, the internal parts being located in position to deliver the lubricant to the member to be lubricated. Fig. 8 illustrates a view of a section taken on the plane of the line 8—8 indicated in Fig. 7.

In the form of construction selected as an example of the embodiments of my invention, an appropriate pressure means, such as the hand pump 1, may be connected by a suitable pipe line 3 to various feeders 2. The pressure pump is of the well known screw-handle type pump which is served with a lubricant 4 from a suitable reservoir 5.

The internal construction of the feeder 2 is made up of a slidable member having means for drawing within itself a definite amount of the lubricant, and under a pressure exerted by the pump on the lubricant to carry it to a discharging point in proximity to the bearing member. A by-pass channel is provided in the feeder to allow the lubricant, under pressure, not used in one feeder, to pass on through the line to the next sequential feeder. The return and subsequent refill of the sleeve member is actuated by an adequate pressure means, such as by a spring or by reversing the direction of pressure on the lubricant in the line.

In the lubricating system shown for purposes of illustration, the feeder 2 has an external body wall 10 having openings 11 and 12 at each end. The openings 11 and 12 may be suitably threaded to connect the pipe line 3 to the feeder. The wall 10 forms an inner cylindrical chamber 13, the end portions 14 and 15 of which are larger in diameter than the central portion 16. A hollow sleeve member 20 is located within the chamber 13 having an external diameter substantially the diameter of the central portion 16 of the chamber and adapted to slidably move through the central portion 16.

The sleeve member 20 is cylindrical in form and is sealed at one end by the plug 21 and at the other end by a plug 26 to form within the sleeve member a chamber 22. A plunger 23 is located within the chamber 22 and is adapted to slidably move through the chamber 22. The plunger has a suitable shank 24 which is slidably supported in, and extends through an opening 25 formed in a plug 26. As the sleeve member moves within the central portion 16 of the chamber 13, the end of the shank 24 will abut against the end portion of the external wall 10 of the feeder to force the piston head 23 to move within the chamber 22 and substantially displace the contents of the chamber 22 in its stroke. Thus, a lubricant, which may be contained within the chamber 22 of the sleeve member, will be put under an increasing pressure, as the sleeve moves, until it is released into a pipe connected to the member to be lubricated.

In order that the lubricant may be received in the chamber 22 of the sleeve member and be extruded to a pipe connecting with the member to be lubricated, the sleeve member has a suitable port 27 which connects the chamber 22 of the sleeve member with the enlarged end portion 14 of the feeder. The lubricant is directed to the enlarged portion 14 of the feeder by the pipe 3 by the pump 1. The lubricant will distribute itself substantially throughout the enlarged portion 14 and in a position for ready movement into the sleeve member through the port 27. In order to draw the lubricant within the sleeve member through the port 27 subsequent to a discharge of lubricant therefrom, a pin 45 is slidably supported in the plug 21 of the sleeve member and cooperates with the plunger 23 to cause a substantially vacuous condition within the sleeve and consequently draw into the sleeve a refilling charge of lubricant. The pin 45 engages the end wall of the feeder body 10 and the face of the plunger 23, as the sleeve is moved towards its initial position, to cause movement of the plunger within the sleeve member and produce thereby a suction through the port 27. The chamber 22 being of definite volume, there will be a constant and definite amount of lubricant which will be received by the chamber 22 and, consequently, served to the bearing member regardless of the variation of pressure of the pump 1, and also regardless of the varying resistance to the extrusion of the lubricant to points between bearing members.

After the lubricant has been distributed through the enlarged portion 14 of the feeder, and drawn within the chamber 22 of the sleeve member, the pressure, produced by the pump 1, will exert itself on the face of the plug 21 of the sleeve member and cause the sleeve member 20 to move along the central portion 16 of the feeder until the port 27 and an annular groove 28 formed in the wall of the sleeve member and connecting with the port is brought into alignment or registration with a port 30 in the wall of the feeder, to which is connected a bearing member to be lubricated, by a suitable pipe 31. The lubricant contained within the chamber 22 of the sleeve member will be forced through the port 27, the groove 28 and the port 30 by the displacing movement of the plunger within the sleeve.

In order to allow for further dissipation of the pressure on the lubricant and to serve feeders which are further remote from the pump 1, a by-pass channel 35 is provided in the feeder wall 10. The channel 35 has a suitable port 36 which is located in the central portion 16 of the chamber of the feeder. The port is so located, with respect to the sleeve member, that it will be uncovered by the sleeve member only when the sleeve member is in a position of completed lubricant delivery, as shown in Fig. 4. The channel 35 may connect with the enlarged portion 15 of the chamber of the feeder, thereby allowing the lubricant to escape through the opening 12 to the pipe line 3 and the sequential feeders 2.

In order to return the sleeve member to its initial position at the completion of the lubricating operation, a spring, such as the spiral spring 38, is provided. The spring 38 is located so as to fit against the plug of the sleeve member and an end of the body wall 10 of the feeder. As the sleeve member is moved towards the lubricating position, the spring 38 will be gradually compressed and will continue to remain compressed until the pressure, caused by the pump 1, on the lubricant has been exhausted or otherwise released. The spring 38 will then tend to return to its normal shape, causing thereby movement of the sleeve member to its initial position and lubricant refilling of the sleeve by the cooperation of the pin 45 and the plunger.

In the modified form shown in Figs. 6, 7, and 8, the return of the sleeve member is caused by reversing the pressure on the lubricant and, consequently, the movement of the lubricant through the pipe line 3 and the feeders 2. For the purpose of effecting this reversal in the system having only pressure means, I supply a suitable four-way valve 40, well known in the art, in the line 3. Thus, when it is desired to cause the return of the sleeve member of the feeder, the valve is operated to direct the lubricant in an opposite direction in the pipe line.

In order to allow for by-passing the lubricant where the lubricant is used for causing the return of the sleeve member, an auxiliary port 41 is located in the wall of the central portion 16 of the feeder. A channel 42 connects the port 41 with the enlarged end portion 14. The port 41 is so located in the central portion of the chamber 11 as to be open only when the sleeve member has returned to its initial position shown in Fig. 6.

Suitable one-way valves 44 may control the openings of the channels 35 and 42 into the enlarged portions 14 and 15 of the feeder to prevent the undesired escape of the lubricant through the channels.

The movement of the lubricant in the system being indicative of the completed operation of the plurality of feeders in the line, and the consequent lubrication of the bearing member, I provide a port 46 in the pipe line 3. The port 46 is covered by a transparent sheet material, such as glass, to prevent the escape of the lubricant through the port and to permit substantial visibility therethrough.

I claim:

1. In combination with a source of supply of lubricant, a lubricating system comprising a plurality of feeder bodies, each feeder body having a lubricant inlet port and a lubricant discharge port, means for connecting the inlet port with the source of supply of lubricant, a cylinder member slidably supported within the feeder body, the cylinder member having a port adapted to sequentially register with the inlet port and discharge port, a piston slidably supported within the cylinder member and limitably movable therewith, means for exerting a pressure on the source of supply of lubricant to move the cylinder member toward the feeder body discharge port, means for engaging the piston at a predetermined point in the movement of the cylinder member to arrest the movement of the piston relative to the feeder body to discharge the lubricant within the cylinder member upon substantial registration of the cylinder member port with the discharge port, resilient means energized by movement of the cylinder member toward the discharge port to move the cylinder member in the opposite direction upon releasement of the pressure on the source of supply, and means adapted to engage the piston at a predetermined point in the movement of the cylinder member in the opposite direction whereby, upon substantial registration of the cylinder member port and the inlet port, the cylinder member will be recharged with lubricant.

2. In a lubricating system, a feeder body having an inlet port and a discharge port, the feeder body having a sleeve member slidable therein, the sleeve member having a chamber for containing a lubricant, a port formed in the walls of the chamber and adapted to alternately communicate with the inlet and discharge ports of the feeder body, means slidably supported within the chamber for displacing the lubricant from the chamber, means for arresting the movement relative to the feeder body of the first named means as the sleeve member is moved in a direction to locate the chamber port substantially in registration with the discharge port, and an element movable with respect to the sleeve member for arresting the movement of the said first named means relative to the feeder body for causing subsequent charging of the chamber with a lubricant when the sleeve member is moved in an opposite direction to locate the chamber port substantially in registration with the inlet port.

3. In a lubricating system, a feeder body having an inlet port and a discharge port, the feeder body having a sleeve member slidable therein, the sleeve member having a chamber for containing a lubricant, a port formed in the wall of the chamber and adapted to alternately communicate with the inlet and discharge ports, means slidably supported within the sleeve member for displacing lubricant from within the chamber, means for arresting the movement of the first named means relative to the feeder body as the sleeve member is moved relative to the feeder body in a direction to locate the chamber port substantially in registration with the discharge port, and an element movable with respect to the sleeve member adapted to arrest the movement of said first named means at a predetermined point in the movement of the sleeve member in an opposite direction to locate the chamber port substantially in registration with the inlet port, said predetermined position being dependent on the quantity of lubricant desired to be introduced into the chamber.

4. A lubricant device comprising a closed tubular feeder body, the feeder body having an inlet port and a discharge port, a sleeve member slidably supported within the feeder body and adapted to be reciprocated therein, a pair of plugs, each of the ends of the sleeve member closed by one of the said pair of plugs and forming a chamber within the sleeve member, a port formed in the wall of the sleeve member and adapted to be located alternately in communication with the inlet port and the discharge port, a plunger slidably supported in the chamber of the sleeve member, the plunger having a shank slidably extended through one of the said pair of plugs, the shank adapted to engage a wall of the feeder body on movement of the sleeve member in one direction whereby the movement of the plunger relative to the feeder body is arrested during the continued movement of the sleeve member to locate the chamber port in substantial registration with the discharge port, a resilient means energized by the said movement of the sleeve member tending to move the sleeve member in an opposite direction, a pin member slidably extending through the other of said pair of plugs, the pin member adapted to engage a wall of the feeder body and the plunger on movement of the sleeve member in said opposite direction to arrest the movement of the plunger relative to the feeder body whereby, upon continued movement of the sleeve member in said opposite direction to locate the chamber port in substantial registration with the inlet port, the plunger will be moved relative to the chamber port.

5. In a lubricating system, a feeder body having an inlet port for receiving a lubricant and a discharge port for delivering a lubricant, a sleeve member slidably movable within the feeder body, means for moving the sleeve member in the feeder body, the sleeve member having a chamber for containing a lubricant, a port formed in the wall of the chamber and adapted to alternately communicate with the inlet and discharge ports, a displacing means slidably supported within the chamber and movable upon movement of the sleeve member, means for arresting the movement of the displacing means relative to the feeder body as the sleeve member is moved in a direction to locate the chamber port in substantial registration with the discharge port whereby discharge of a lubricant from the chamber is effected upon substantial registration of the chamber port and the discharge port, and an element slidably supported by the sleeve member for arresting the movement of the displacing means relative to the feeder body as the sleeve member is moved in a direction to locate the chamber port in substantial registration with the inlet port, whereby charging of the chamber with a lubricant is effected upon registration of the chamber port with the inlet port.

6. In combination with a source of supply of lubricant and means for exerting a pressure on the said source of supply of lubricant, a lubricating system comprising a feeder body having an inlet port and a discharge port, means for connecting the source of supply of lubricant with the inlet port, the feeder body having a sleeve member movably supported therein, the sleeve member having a chamber for containing a lubricant, a port formed in the wall of the chamber and adapted to alternately register with the inlet port and the discharge port, a plunger means slidably supported within the chamber, means for arresting the movement of the plunger means relative to the feeder body for discharging the lubricant from the chamber as the sleeve member is moved by a pressure exerted on the source of supply of lubricant to a position of substantial registration of the chamber port with the discharge port, means for moving the sleeve member in the opposite direction upon the release of the said pressure on the source of supply of lubricant, and an element movable with respect to the sleeve member adapted to arrest the movement of the said plunger means with respect to the feeder body as the sleeve member is moved in said opposite direction after the said release of the pressure upon the source of supply of lubricant to draw lubricant from the inlet port into the chamber upon substantial registration of the chamber port with the inlet port.

7. A lubricating device comprising a feeder body having an inlet port and a discharge port, means for supplying a lubricant to the inlet port, a sleeve member having a lubricant containing chamber formed therein, the chamber having a port, the sleeve member being slidably movable within the feeder body, the chamber port adapted to alternately register with the inlet port and the discharge port dependent upon the direction the sleeve member is moved, means slidably supported in the chamber and actuated relative to the chamber to produce at a predetermined point in the movement of the sleeve member toward the discharge port a discharging of the lubricant from within the chamber upon substantial communication of the chamber port with the discharge port, compressible means energized by the said movement of the sleeve member tending to move the sleeve member towards the inlet port, and means movable with respect to the sleeve member for arresting the movement of the second named means at a predetermined point in the movement of the sleeve member towards the inlet port for drawing lubricant to within the chamber upon substantial communication of the chamber port with the inlet port.

8. A lubricating device comprising a feeder body having an inlet port and a discharge port, means for supplying a lubricant through the inlet port, a container member having a port, the container member slidably supported within the feeder body, the container member port adapted to alternately register with the inlet port and the discharge port according to the direction of movement of the container member with reference to the said inlet and discharge ports, means for moving the container member within the feeder body, a plunger means slidably supported within the container member and actuated at a predetermined point in the movement of the container to produce relative movement between the plunger means and the container port whereby lubricant will be discharged from the chamber upon substantial registration of the chamber port with the discharge port and lubricant will be introduced into the chamber upon substantial registration of the chamber port with the inlet port.

9. A lubricating device comprising a feeder body having an inlet port and a discharge port, means for supplying a lubricant through the inlet port, a container member having a port, the container member slidably supported within the feeder body, the container member port adapted to alternately register with the inlet port and the discharge port according to the direction of movement of the container member with reference to the said inlet and discharge ports, a plunger means slidably supported within the container member and actuated to produce relative movement of the plunger means toward the container port at a predetermined point in the movement of the container member toward the discharge port to discharge the lubricant from within the container upon substantial registration of the container port with the discharge port, and means movably supported by the container member actuating to produce relative movement of the plunger means away from the container port at a predetermined point in the movement of the container member toward the inlet port for drawing lubricant to within the container member upon substantial registration of the container port with the inlet port.

MEREDITH R. HATCH.